(12) United States Patent
Griffin

(10) Patent No.: US 10,765,250 B1
(45) Date of Patent: Sep. 8, 2020

(54) STEAM COOKING APPARATUSES WITH INVERTIBLE STEAMING INSERT BASKETS AND CONTROLLED VENTING LIDS

(71) Applicant: Wyman Harding Griffin, Flagstaff, AZ (US)

(72) Inventor: Wyman Harding Griffin, Flagstaff, AZ (US)

( * ) Notice: Subject to any disclaimer, the term of this patent is extended or adjusted under 35 U.S.C. 154(b) by 151 days.

(21) Appl. No.: 16/035,638

(22) Filed: Jul. 15, 2018

Related U.S. Application Data

(60) Provisional application No. 62/689,895, filed on Jun. 26, 2018.

(51) Int. Cl.
*A47J 27/04* (2006.01)

(52) U.S. Cl.
CPC .......... *A47J 27/04* (2013.01); *A47J 2027/043* (2013.01); *A47J 2202/00* (2013.01)

(58) Field of Classification Search
CPC .................................. A47J 27/04; A23L 5/41
USPC .............................. 99/443; 426/455, 465, 476
See application file for complete search history.

(56) References Cited

U.S. PATENT DOCUMENTS

| | | | | |
|---|---|---|---|---|
| 4,316,447 A * | 2/1982 | Foreman | ................. | A47J 27/04 126/369 |
| 5,813,321 A * | 9/1998 | Bourgeois | ............... | A47J 27/04 99/340 |
| 6,269,737 B1 * | 8/2001 | Rigney | .................... | A47J 27/04 126/369 |
| 6,314,869 B1 * | 11/2001 | Bourgeois, Jr. | .......... | A47J 33/00 99/340 |
| 6,546,849 B1 * | 4/2003 | Shimazaki | .............. | A47J 36/08 210/465 |
| 6,568,314 B1 * | 5/2003 | Stepanova | .............. | A47J 36/08 210/464 |
| 7,237,476 B1 * | 7/2007 | Bourgeois | ............... | A47J 36/26 99/340 |
| 8,707,859 B2 * | 4/2014 | Difante | ................... | A47J 36/20 99/340 |
| 2009/0049990 A1 * | 2/2009 | Schutte | .................... | A47J 36/22 99/339 |
| 2010/0136194 A1 * | 6/2010 | Schutte | .................... | A47J 36/22 426/510 |
| 2011/0168034 A1 * | 7/2011 | Mizell | ...................... | A47J 27/04 99/450 |
| 2012/0174798 A1 * | 7/2012 | Kulikowski | ............ | A47J 36/18 99/340 |
| 2012/0216683 A1 * | 8/2012 | Difante | ................... | A47J 27/18 99/352 |

* cited by examiner

*Primary Examiner* — Nina Bhat
(74) *Attorney, Agent, or Firm* — Invention To Patent Services; Alex Hobson

(57) ABSTRACT

A steam cooking apparatus containing a water retaining cooking vessel with a vertically invertible insert basket and associated vertically adjustable lid which clamps the food stuffs in exact position when insert basket is inverted. Steam cooking apparatus includes an interior pedestal mount, removable insert basket handle, and lid fitting atop of the exterior cooking vessel having multiple specific venting apertures.

14 Claims, 6 Drawing Sheets

STEAM COOKING APPARATUSES WITH INVERTIBLE STEAMING INSERT BASKETS AND CONTROLLED VENTING LIDS

CROSS-REFERENCE TO RELATED APPLICATIONS

This application claims the benefit of U.S. Provisional Utility Patent Application No. 62/689,895, filed Jun. 26, 2018, which is expressly incorporated herein by reference and made a part hereof.

BACKGROUND OF THE INVENTION

The present invention relates to cooking foods with steam, in particular, vegetables and meats on a stovetop vessel. Vegetable steamers have traditionally been defined as an insert basket that is perforated and fits inside a cooking vessel above boiling water, and a lid is placed onto the cooking vessel which covers the insert basket holding food contents. Eventually, stovetop pressurized pots became popular, and most recently, countertop multi-cookers. Although the present invention is not in the realm of pressure and multi-cookers, it is pertinent to mention these latter two as there are a multitude of insert steaming baskets made for such devices which basically resemble wire mesh frying baskets.

Examples of prior insert steam baskets and other food steaming appliances are found in U.S. Pat. No. 2,667,117; 4,138,939; 4,316,447; 4,452,132; 4,920,251; 4,953,452; 8,960,081; and U.S. Pat. No. 9,572,362 to Millard ET AL, Feld, Foreman, Miller, Whitenack, Tarlow, Beard, and Difante, respectively. These devices and their cooking strategies have commonly inherited drawbacks that never fully accomplish the desired criteria that made steam cooking the favorable choice for cooked vegetables retaining the most nutritional value.

Therefore, it is pertinent to consider the commonly given reasons that made vegetable steaming popular; some of the nutrients are water soluble and leech away in boiling water, and nutrients deplete with high heat. Hence, the above methods for steaming vegetables and other foods have not really fled to far from high heat water boiling, as most pressure and multi cookers generate temperatures of 250-280 degrees of watery vapors, and these same high temperatures are commonly achieved with the stove top cooking vessels that use steaming insert baskets, and food nutrients are quickly being depleted. These high temperatures derive due to the fact that such devices commonly use a lid to control rapid evaporation, but usually with only one or two venting holes for the release of rising vapors, causing pressurization and high heat, and food is partially cooked through the process of convection that does not allow for the utilization of the natural laws of physics, consistent vapor rise, which is a more thorough and quicker cooking method that reduces nutritional depletion.

Another inherit problem with the above cooking methods is that the foods are cooked from the bottom upwards as the steam rises until hampered, due to the venting limitations, and an uneven process since the vegetables aren't able to be flipped, and the bottom portion of the food is overcooked before the top portion reaches desired tenderness, and another reason for excessively depleted nutrients. That at least half of the food cooked during such a process is overcooked is evident from the color of the water in the bottom of the vessel, it is the same color as the food that's overcooked. Food properly steamed will leave only a slight tint in the remaining water. Moreover, a steaming device advertising the versatility to cook meats, would allow for a hamburger pattie to be flipped, or turned upside down and allow even cooking on both sides of the pattie in traditional manner, and this option for even cooking should also be made available for vegetables. None of the above apparatuses allow for such even cooking.

One of the above mentioned patented devices claims to have steam needles to "brown the top of the foods," but respectively, the drawback is that only the very top of the food is attended to in this manner and most of the food still faces an uneven cooking process. Of the just mentioned process, if the steam could reach every top portion of the foods, then this would mean that super pressurized heat would need to be generated to push the steam downwards, and such super temperatures would be counter-productive due to quicker nutritional loss.

Furthermore, overcooked portions of food occur because of the stove burner being used, as heat may be dis-proportionally dispensed at the bottom of the cooking vessel. Also, the vessel itself may be deformed or made of materials that dis-proportionally spread the heat, and this can be determined if some of the water bubbles are larger than the rest, and the entirety of the bubbles are uneven. These latter three factors contribute to uneven rise of heat vapors inside the vessel, and further overcook portions of the food, and again, further nutritional loss. There thus exists a need for a more even cooking method that also hastens the cooking process.

SUMMARY OF THE INVENTION

The primary object of this invention is to provide users with a simple, inexpensive, and practical stovetop method to cook their foods, particularly vegetables, in a manner where every part and portion is evenly cooked to the desired tenderness, without portions of the foods being overcooked.

It is an object of this invention to allow users to use a part of the invention with their already acquired pots, pans, and other devices.

A further object of the present invention is to use the natural laws of physics: water consistently flows with the least path of resistance, and so does the consistent rise of water vapors, enabling a quick and thorough steaming process. It is this process that teaches the user to move away from the super-heated steam methods and drawbacks mentioned in the prior arts section.

Another and still further object of this invention is that it can be used as a sterilization tool to clean vegetables and fruits of contaminants before cooking and consumption. These objectives are accomplished with the present invention, which includes an exterior cooking vessel commonly referred to as a pot, a food holding insert basket that fits inside the exterior pot, a perforated lid that fits inside the insert basket and is vertically adjustable, a pedestal that rest on the inside bottom of the exterior cooking pot and used to support the food containing insert basket that will rest on the pedestal and keep the insert basket above the cooking water in the bottom of the pot, and a lid that has a multitude of venting holes across its entirety, and fits on top of the exterior pot. There is also a detached handle to lift insert basket and remove from exterior pot.

The uniqueness of this invention primarily rests with the utilization of the insert baskets and its perforated vertically adjustable lids. When these two components are used together, the insert basket can now be vertically inverted 180 degrees as the food contents remain inside. Finishing the uniqueness of the invention is the lid that fits atop of the exterior pot. This lid has multiple venting holes that controls and sets the pattern or path of the rising vapors from the bottom of the pot upwards.

The perforated lids for these interior insert baskets are made to precisely fit inside the insert baskets and not allow food stuffs to fall out. These vertically adjustable lids are latched into place with a bolt type mechanism directly above and on top of the food, and keeps food exactly in its same position as the insert basket is vertically inverted 180 degrees to further the even cooking process.

Completing the even cooking process is the perforated lid of multiple venting holes that fits on the exterior pot. These predetermined venting holes are strategically placed, and as briefly mentioned in paragraph twelve, set and regulate the consistent rise of heat vapors. To elaborate, these venting holes are very small and placed in a way as to evenly distribute uneven heating patterns that perhaps occur inside the exterior cooking pot because of the stove burner and its distribution of fuel. Basically, vapors rising faster than other sections of the pot are slowed down because of the small size of the venting hole, which forces faster rising vapors to seek the next available path of escape, the next small venting hole, the next path of least resistance. The desired quick and thorough consistent rise of vapors moves unhindered and not forced to move laterally, where the stagnant, pressurized, and ineffective high heat convection process develops. Thus, rising vapors, and lower temperature moisturized heat are evenly distributed at the bottom portion of the cooking pot where the desired consistent heat rise path is initially generated. The desired quick, thorough, arid consistent rise of unhindered upward moving heat allows foods to be cooked at effective temperatures of 195 degrees, well below the 212 degree boiling point, and the superheat temperatures referenced in the prior arts section.

DESCRIPTION OF THE PREFERRED EMBODIMENT OF THE INVENTION

Figure 1:
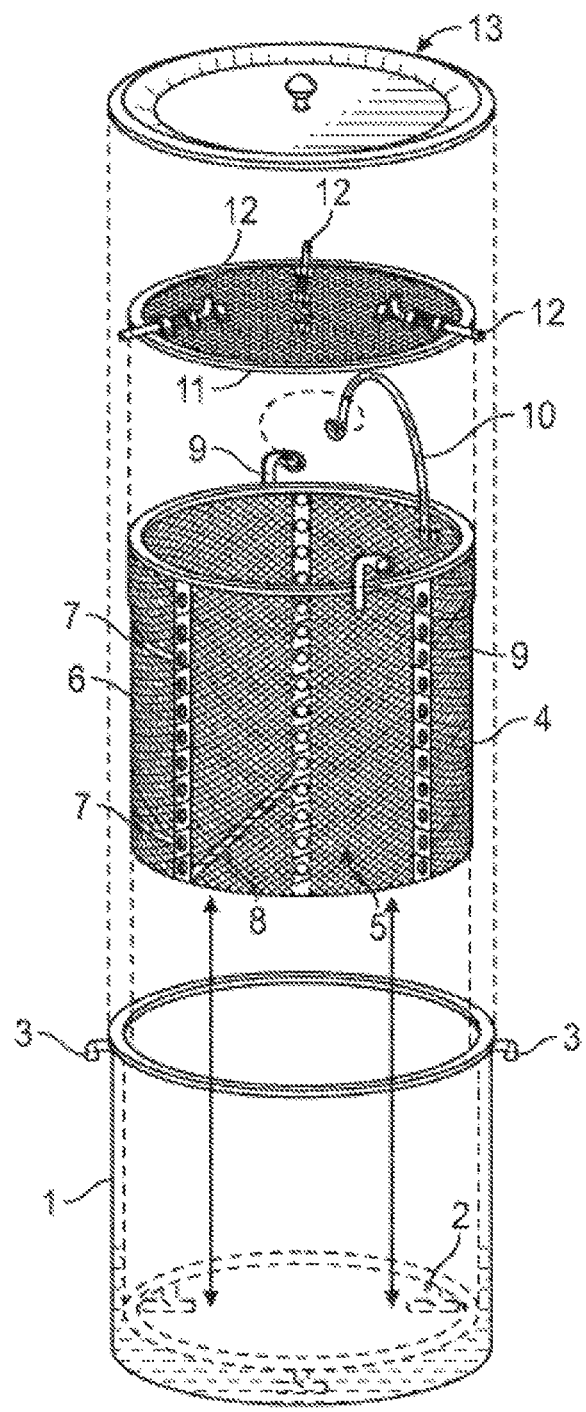
FIG. 1 is an exploded view of the cooking apparatus of present invention, and its itemized parts.
Figure 2:
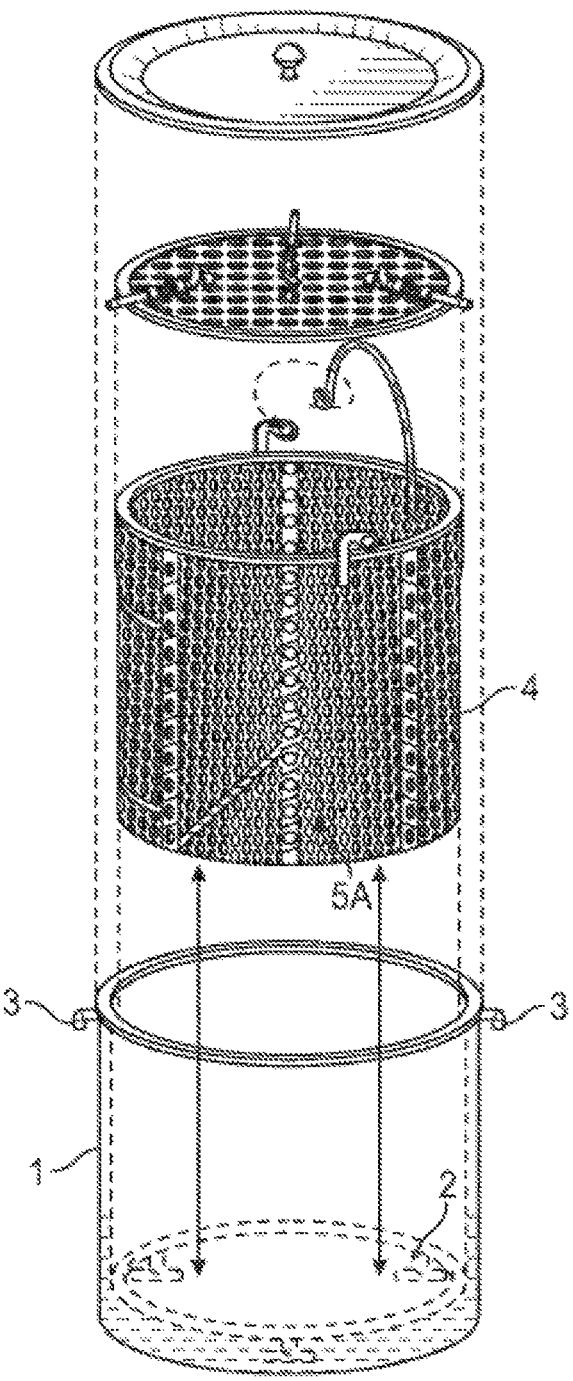
FIG. 2 is the same as FIG. 1, except the insert basket and its lid are not wire mesh.
Figure 3:
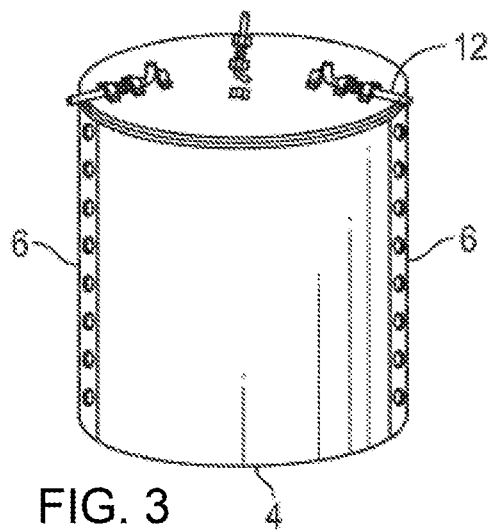
FIG. 3 illustrates the insert baskets vertically invertible design and vertically adjustable lid.
Figure 4:
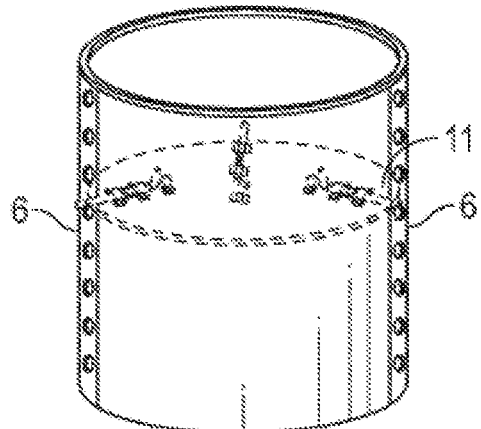
FIG. 4 illustrates the insert baskets vertically invertible design and vertically adjustable lid.

Defining the present invention in relationship to the drawings is FIG. 1 and FIG. 2, which shows the exterior circular cooking vessel or pot 1, having a bottom and vertical upwards wall, and open at the top, and handles on both sides 3. The exterior pot 1 may include alignment marks to correspond with the alignment marks of the exterior lid 13. The second component of the cooking apparatus is the pedestal 2, which is slightly smaller in circumference than the inside dimension of the pot 1 and fits inside the pot 1 and rests on the inside bottom of the pot 1. The pedestal 2 will have at least three legs or more and is use to support the insert baskets 4 above the steaming water. The top surface of the pedestal 2 is planar. The pedestal 2 may be larger or smaller in dimension than the insert basket 4 and may have three or more support wires or metal strips for structural integrity and may perhaps be similar in design as the insert basket lid 11 illustrated with FIG. 7, and basically divided into thirds where every support strip starts from the perimeter of the pedestal 2 and meets in the middle. These support strips for the pedestal 2 may extend beyond the circumference or perimeter in a planar manner and stop short of touching the inside walls of the pot 1, and are used to prevent horizontal sliding of the pedestal 2 as the insert basket 4 is placed on top.

Figure 5:
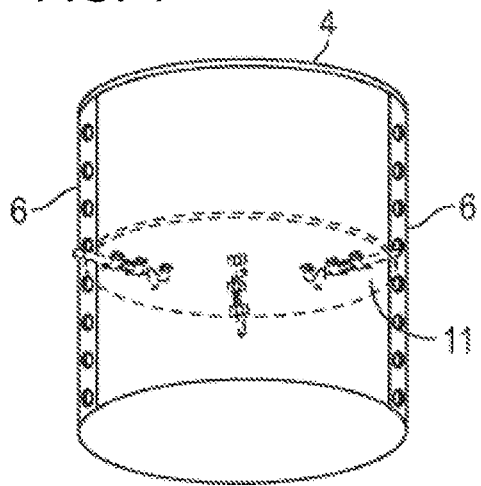
FIG. 5 illustrates the insert baskets vertically invertible design and vertically adjustable lid.
Figure 6:
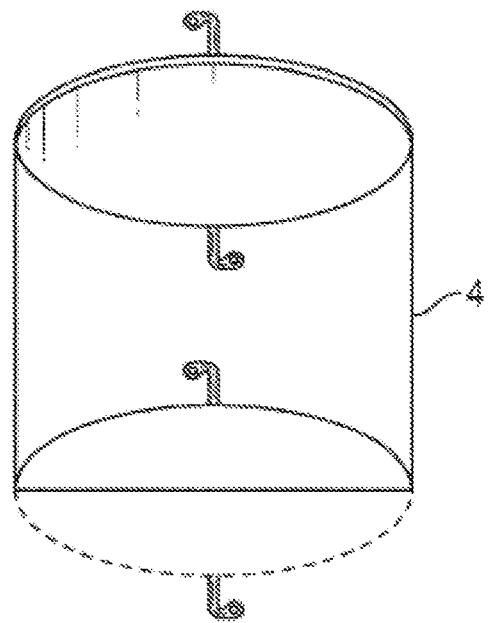
FIG. 6 illustrates the insert baskets vertically invertible design.
Figure 10:
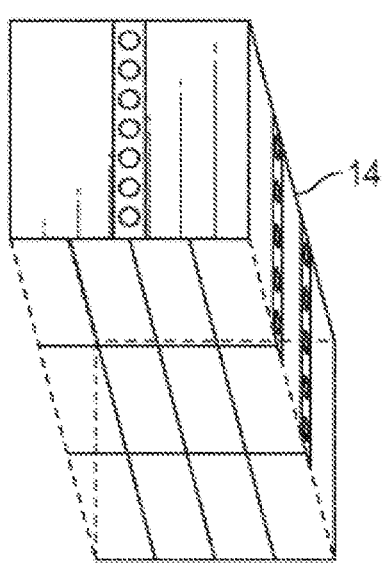
FIG. 10 is a perspective view of rectangular design steaming insert basket with reinforcements.
Figure 11:
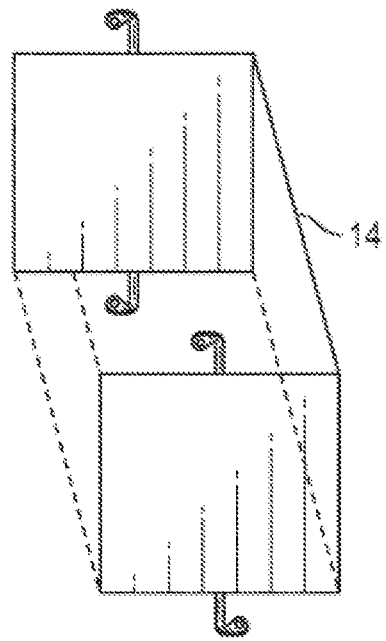
FIG. 11 is a perspective of rectangular design steaming insert basket with handle hinges.
Figure 12:
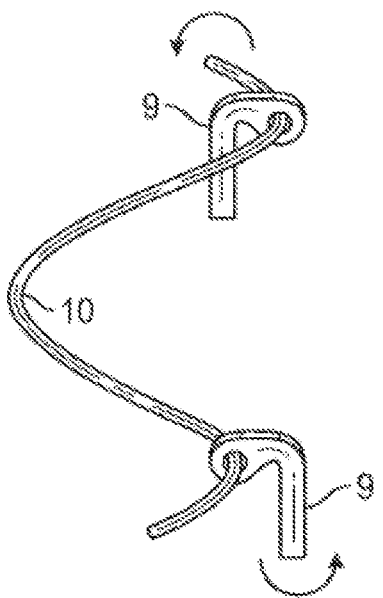
FIG. 12 illustrates steaming insert basket handle and hinges, and how handle fits underneath hinge hook as shown with counterclockwise arrow movement.
Figure 13:
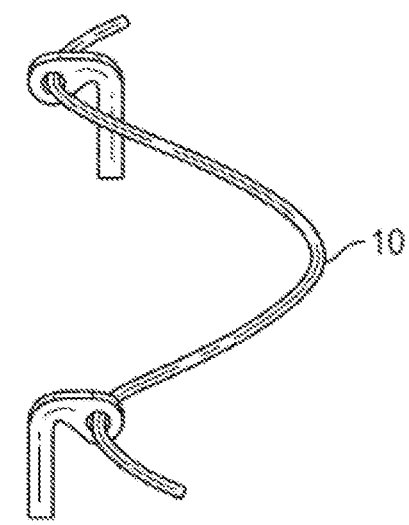
FIG. 13 illustrates stealing insert basket handle and alternative fit and usage into hinge holes.
Figure 14:
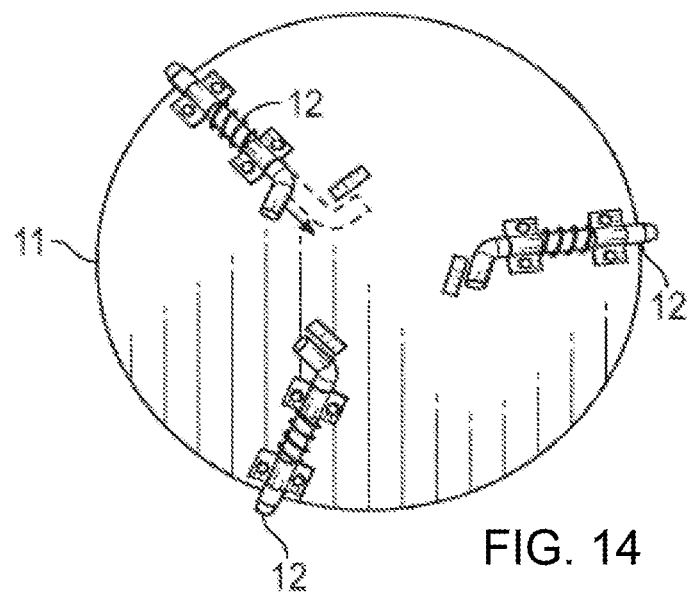
FIG. 14 shows a top view of insert basket lid with bolt latches.
Figure 15:
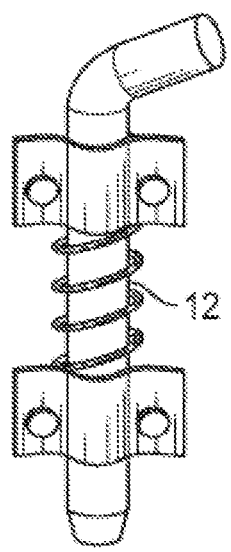
FIG. 15 shows a top view of a latch bolt.
Figure 16:
FIG. 16 shows a top view of a latch bolt.
Figure 17:
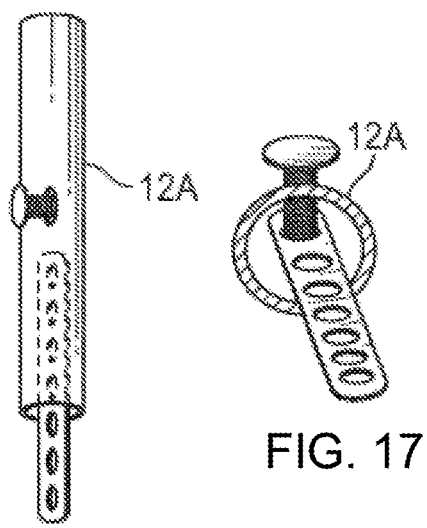
FIG. 17 shows a perspective view of a latch bolt.
Figure 18:
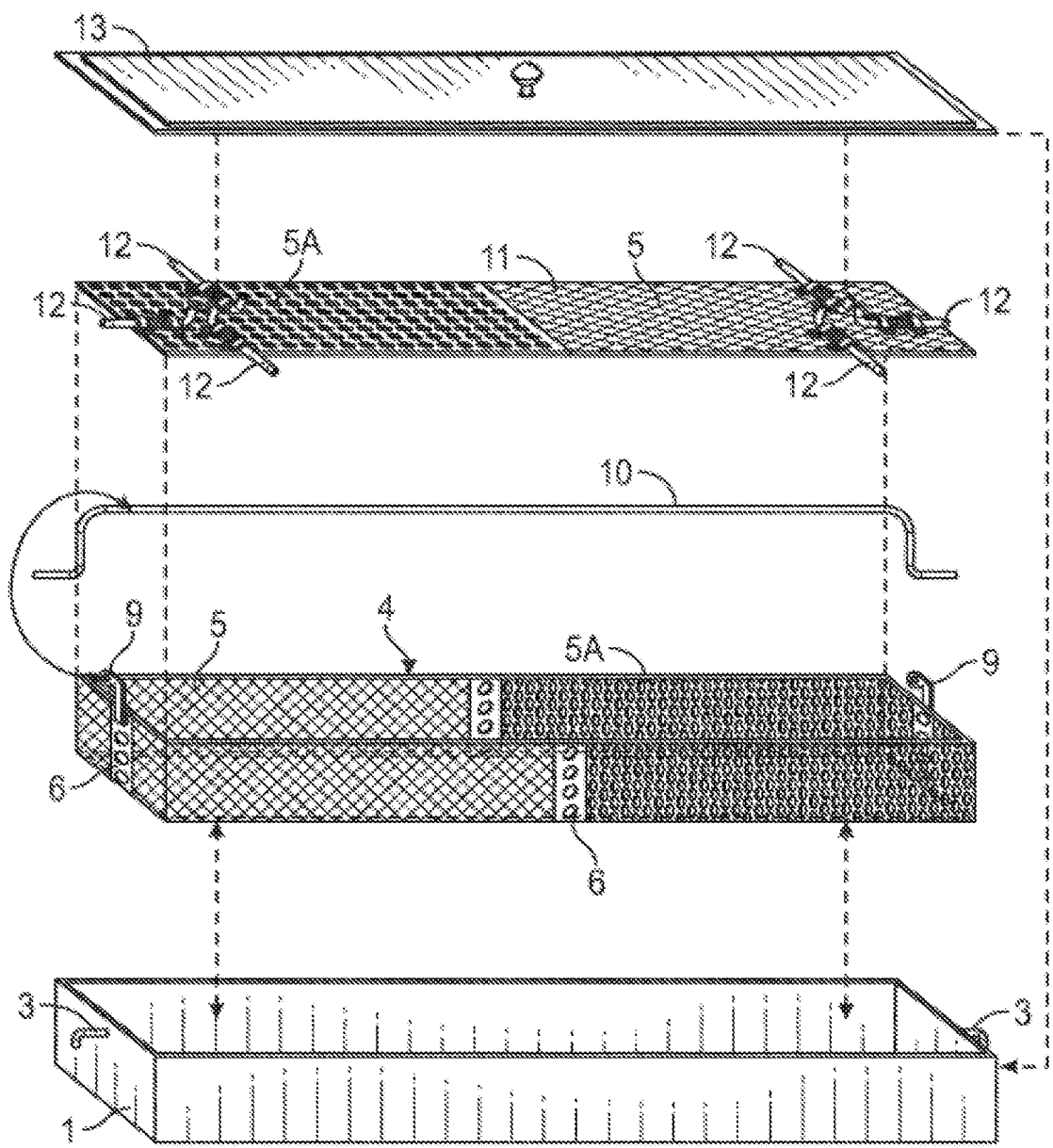
FIG. 18 is an exploded view of the cooking apparatus of present the invention.

The next component is the vertically invertible insert basket 4 which is circular in design and smaller in circumference to fit inside the pot 1, and contain the food items. These insert baskets 4 are made of either wire mesh of various gauge thickness and various apertures sizes of the mesh 5, or of metal and perhaps other suitable materials that are perforated with apertures SA as shown in FIG. 2. The insert baskets 4 will have at least three support columns 6 to provide structural support and also serve as the latching column for the lid 11 that fits inside the insert basket 4, therefore the support columns 6 have holes that are considered latching holes, and these columns 6 continue to wrap underneath the insert basket 4 and join in the middle of the bottom of the insert basket 4, and are now only considered support brackets 8. There may also be two other support strips 7 that are parallel and a few inches above the bottom and a few inches below the top perimeters of the insert basket 4 and wrap around the entirety of the circumference of the insert basket 4. At the top rim and bottom rim of the insert basket 4 there will be four (4) lifting hinges or hooks 9, illustrated in FIGS. 6, 11, and FIG. 18, two on top and two on the bottom, and may be attached to the inside or outside wall of the insert basket 4, preferably linked to structural support strips 7, and FIGS. 10, and 14, and FIG. 18. An attached or unattached handle 10 is illustrated in FIGS. 12, 13, and is used in conjunction with the lifting hooks 9 to lift the insert basket 4 out of the pot 1. The lid 11 for the insert baskets 4 is circular in circumference and planar in design and slightly smaller in perimeter circumference than the insert baskets 4 so as to fit inside the insert baskets 4, and is vertically adjustable to move up and down the inside of the insert baskets 4. The insert lid 11 or insert basket lid 11 has on its top three or more sliding latching bolts 12 that allow the insert basket lid 11 to be latched and secured into place as the sliding latching bolts 12 inserts into the latching holes of the latching support column 6. It is this vertically adjustable insert basket lid 11 that once locked into the desired height directly above food contents that allows the insert basket 4 to become 180 degrees invertible with inside food stuff staying intact of movement, and illustrated in FIGS. 3 to 6, and FIG. 14. The insert basket lid 11 will have the same construction that matches the insert basket 4, and also illustrated in FIG. 18, either wire mesh of various gauge thickness and various apertures sizes of the mesh 5, or of metal and perhaps other suitable materials that are perforated with apertures as shown in FIG. 2, and FIG. 18, 5, Sa. FIG. 18 also illustrates the different perimeter designs the cooking vessel I may take, and the resulting associated perimeter design of invertible insert basket 4 and invertible insert basket lid 11.

Figure 7:
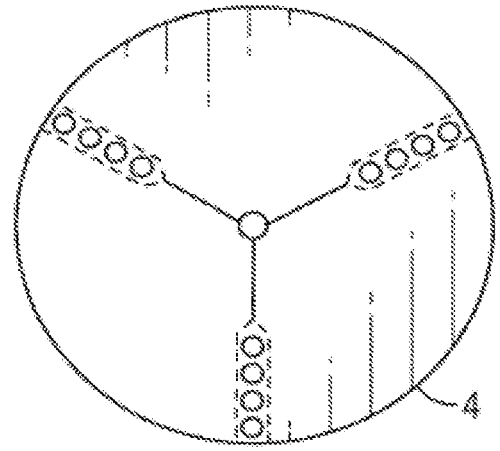
FIG. 7 is a top view illustration of an insert basket lid.

The insert basket lid 11 may also be allowed to only be vertically adjustable to a certain extent at the top of the opening of the insert basket 4 so that the latching bolts 12 do not rise above the top of the walls of the insert basket 4, thus allowing an exterior pot lid 13 to be made completely planar in design, and also means the walls of the insert basket 4 become a means of support and bearer of weight, as the insert basket lid 11 would not touch the top of the weight bearing pedestal 2 when the insert basket 4 is inverted. The insert basket lid 11 is also re-enforced with wire or metal strips and divided into thirds and attached from the perimeter of the insert basket lid 11 and meets in the middle as shown in FIG. 7. It is at the perimeter of the insert basket lid 11 where the re-enforcement wires are attached in sections of thirds that the latching bolts 12 will also be stationed for support, as once the insert basket 4 is vertically inverted the insert basket lid 11 becomes the floor and bottom of the insert basket 4, although the insert basket lid 11 is recessed as defined two sentences ago.

Figure 8:
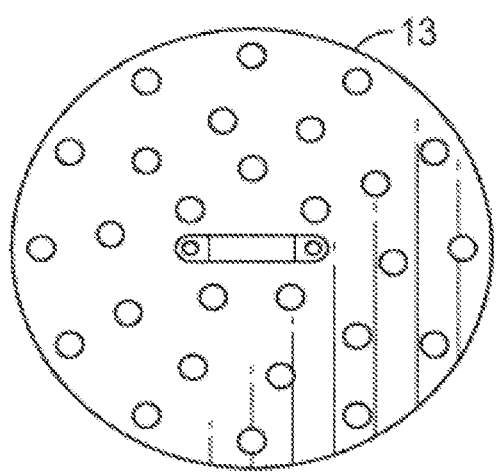
FIG. 8 is a top view illustration of an insert basket lid made of perforated metal.
Figure 9:
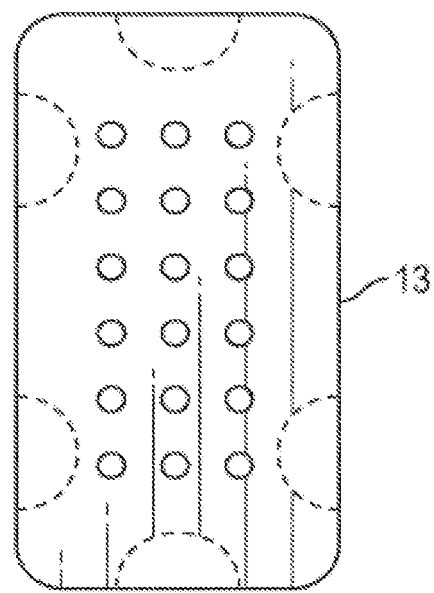
FIG. 9 is a top view illustration of rectangular design steaming insert baskets lids with perforated venting holes.

The present invention apparatus and cooking method becomes complete with the definition of the exterior pot lid 13 that fits on top of the cooking pot or vessel 1, and has a centrally located handle, which is shown but not numbered. The exterior pot lid 13 may have a 90 degree vertical wall just high enough to clear the inseli basket 4 and its latching bolts 12 and then becomes planar and flat in design, hence, not a domed lid. The purpose of a non-domed lid 13 is to more quickly adjust the rising heat patterns as explained in the summary of the present invention. The exterior pot lid 13 has specific, precise, and strategically placed apertures, or vapor venting holes that are small enough to regulate and evenly distribute the constant and consistent upward flow patterns of rising vapors or steam, and these small venting holes are illustrated in FIGS. 8 and 9 are placed throughout the entirety of the exterior pot lid 13. In particular, venting holes are precisely placed so as to allow vapor venting directly above the latching bolts 12 of the insert basket lid 11. One of the apertures or venting holes of the exterior pot lid 13 may be made large enough to insert a thermometer prong, and this particular temperature aperture may remain open or covered by the user with a provided blocking shield not shown, and may perhaps be centrally located underneath the handle venting upwards through the handle where the blocking shield is also encompassed.

The present invention of cooking apparatuses is versatile in the method of thorough and even food steaming with the use of the vertically invertible steaming insert basket 4, which construction may or can be of wire mesh of various gauge thickness and various apertures sizes of the mesh 5, to not allow uncooked rice or thin pastas to fall through, and this sort of wire mesh insert basket 4 can be used without the pedestal 2 and allow the insert basket 4 to be submersed in steaming water to kick start rice and pastas to develop and then finish the cooking process using the pedestal 2 and steam or vapors.

Relatively, the preferred embodiment of present invention and related low temperature steam cooking method, acknowledge to those skilled in the associated art that it will be obvious that many modifications of structure, materials, components, proportions, design, and arrangements used in the composing practice of present invention can be particularly adapted for specific environments and operations without departing from these principles.

What is claimed is:

1. A method of steam cooking food comprising:
   a) providing a steam cooking apparatus comprising:
      i) a cooking vessel;
      ii) a basket configured for insertion into the cooking vessel having a plurality of venting apertures;
      iii) an insert basket lid having a plurality of venting apertures and configured for insertion into the basket and comprising a latching mechanism that is configured to slide radially outward from the insert basket lid to secure the insert basket lid to the basket;
   b) placing water in the cooking vessel;
   c) placing said food into the basket;
   d) inserting the insert basket lid into the basket and over the food;
   e) sliding the latching mechanism radially outward to secure the insert basket lid in a vertical position within the basket;
   f) placing the basket into the cooking vessel;
   g) heating the cooking vessel to produce steam to cook the food for an initial cook time;
   h) removing the basket from the cooking vessel after said first cook time;
   i) inverting the basket and retaining the food therein with the insert basket lid;
   j) inserting the inverted basket back into the cooking vessel to cook the food with the basket in an inverted position within the cooking vessel for a second cook time; and
   k) removing the basket, removing the insert basket lid and the food therein.

2. The method of steam cooking food of claim 1, wherein the basket comprises a support column that extends vertical along the basket and comprises a plurality of latching holes for receiving the latching mechanism therein.

3. The method of steam cooking food of claim 1, wherein the insert basket lid has a plurality of latching mechanisms and wherein the basket comprises a plurality of support columns, each configured to receive a latching mechanism of said plurality of latching mechanisms.

4. The method of steam cooking food of claim 1, wherein the insert basket lid has three latching mechanisms and wherein the basket comprises three support columns.

5. The method of steam cooking food of claim 1, wherein the cooking vessel is cylindrical in shape.

6. The method of steam cooking food of claim 1, wherein the cooking vessel has a pedestal extending up from an inside bottom of the cooking vessel to support the basket above the inside bottom of the cooking vessel.

7. The method of steam cooking food of claim 1, wherein the basket further comprising a handle.

8. The method of steam cooking food of claim 7, wherein the handle is detachably attachable to the basket.

9. The method of steam cooking food of claim 1, wherein the steam cooking apparatus further comprises an exterior lid.

10. The method of steam cooking food of claim 9, wherein the exterior lid has a plurality of venting holes therein to allow steam to escape from the steam cooking apparatus.

11. The method of steam cooking food of claim 10, wherein at least one of the plurality of venting holes is configured to receive a thermometer therethrough to measure the temperature within the steam cooking apparatus.

12. The method of steam cooking food of claim 1, wherein the insert basket lid has four latching mechanisms and wherein the basket comprises four support columns.

13. The method of steam cooking food of claim 1, wherein the insert basket lid has six latching mechanisms and wherein the basket comprises six support columns.

14. The method of steam cooking food of claim 1, wherein the cooking vessel is rectangular in shape.

* * * * *